April 11, 1967   I. E. ROSS   3,313,967
DYNAMOELECTRIC MACHINE
Filed May 28, 1964   2 Sheets-Sheet 1
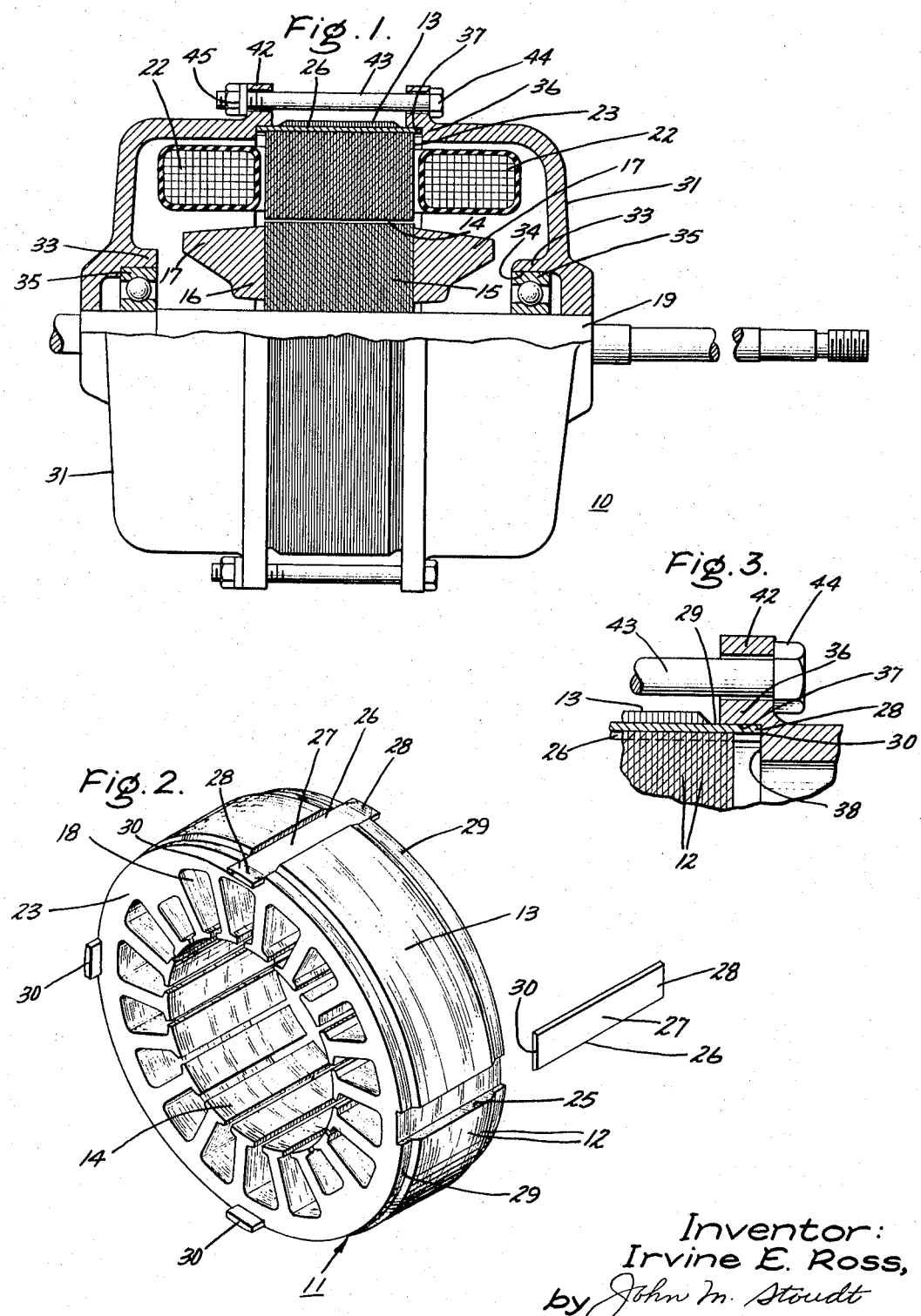
Inventor:
Irvine E. Ross,
by John M. Stoudt
His Attorney.

April 11, 1967  I. E. ROSS  3,313,967
DYNAMOELECTRIC MACHINE
Filed May 28, 1964  2 Sheets-Sheet 2
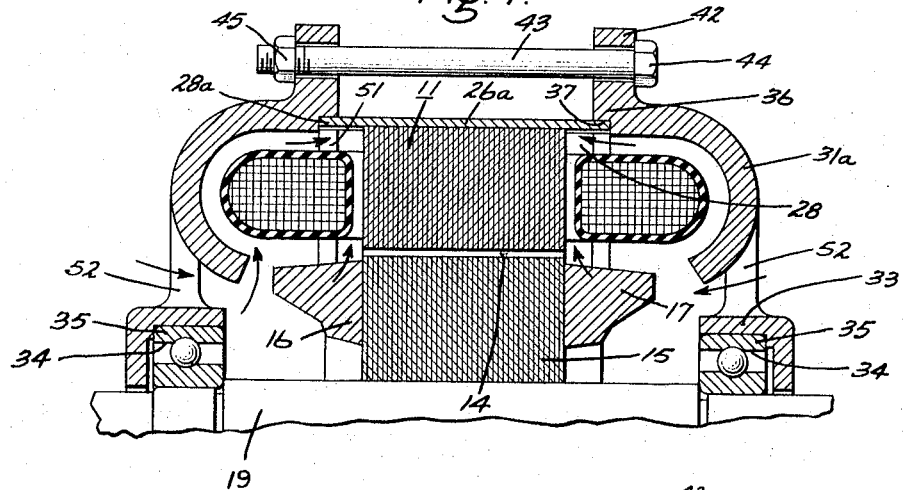
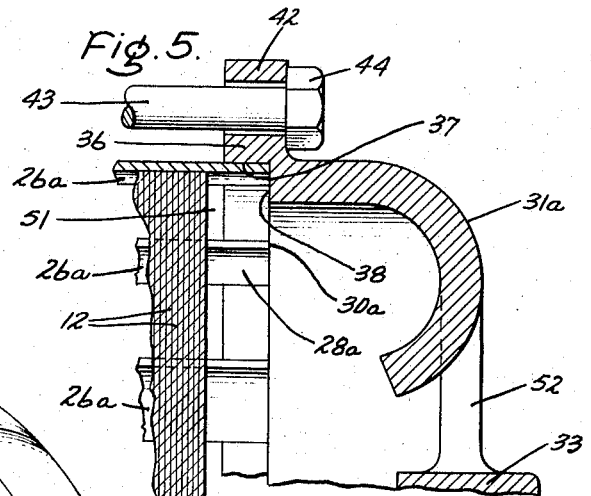
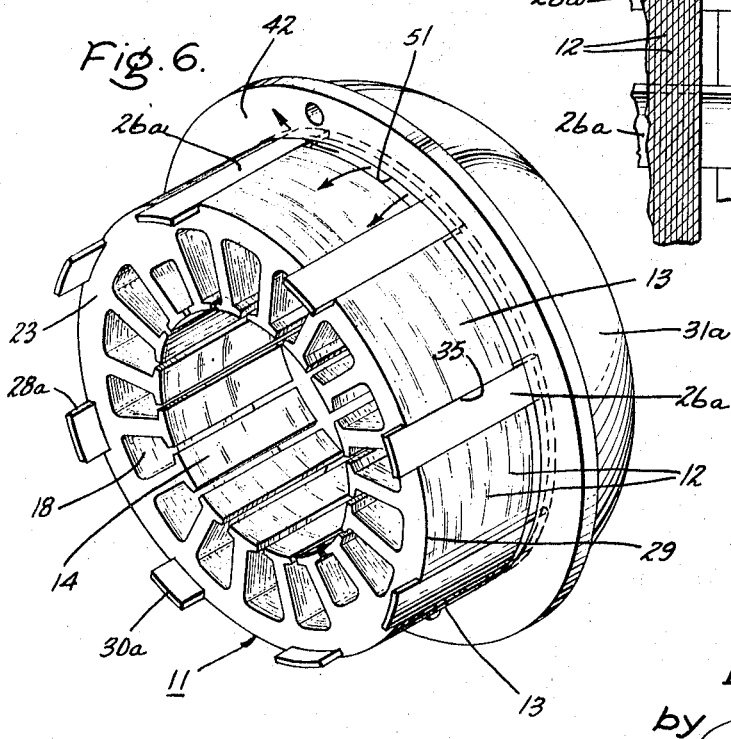
Inventor:
Irvine E. Ross,
by John M. Stoudt
His Attorney.

United States Patent Office 3,313,967
Patented Apr. 11, 1967

3,313,967
DYNAMOELECTRIC MACHINE
Irvine E. Ross, Fort Wayne, Ind., assignor to General Electric Company, a corporation of New York
Filed May 28, 1964, Ser. No. 370,852
6 Claims. (Cl. 310—254)

This invention relates generally to a dynamoelectric machine, and more particularly to an improved arrangement for mounting the end frames of small and fractional horsepower electric motors to stator cores.

As is well known to those familiar with the electric motor and generator field, most electrical equipment utilize a plurality of sheet-like punchings or laminations stacked together to form magnetic cores such as stators. A rotatable member, e.g., a rotor, is concentrically arranged within the bore of the stator, being separated therefrom by an annular air gap which directly affects the efficiency and performance of the motor. The rotor is usually secured to a shaft which, in turn, is rotatably journalled by suitable bearings carried in an end frame arranged at either end of the stator and normally fastened to a central housing.

This construction introduces certain considerations and problems in the manufacture and satisfactory operation of motors which adds to the complexity, size, and over-all cost of the resultant motors. For instance, it is highly desirable and important that the stacked laminations be firmly held together in a satisfactory yet inexpensive manner. It is further desirable that the rotor, stator, shaft, and bearings be properly aligned with respect to one another in both the radial and axial directions at a low cost, especially difficult to achieve in motors of the totally enclosed type. By way of illustration, a practical difficulty has been experienced during their mass production manufacture in providing proper co-axial alignment of the shaft supporting bearings and stator bore with the desired consistency as well as concentricity between the stator and rotor.

Accordingly, it is a primary object of the invention to provide an improved small horsepower dynamoelectric machine construction and a more specific object is to provide such construction having the desirable features mentioned above.

It is a further object of the present invention to provide an improved yet low cost dynamoelectric machine, capable of use in a variety of machine types, in which accurate alignment of components is achieved.

In carrying out the objects of this invention in one form thereof, I provide an improved yet low-cost small horsepower electric motor having a stator core comprised of a stack of laminations secured together in juxtaposed relation by a number of stiff strip members accommodated in complementary grooves provided across the outer periphery of the stack at angularly spaced apart intervals. These strips have free ends extending axially beyond each side face of the core, radially above the end turns, for a predetermined axial distance. In addition, the free ends are transversely curved such that their outer surfaces are, in effect, arcs of the same circle having a center of revolution at the rotational axis of the motor. An end frame is disposed near each side face of the stator and has an annular section mounted to the strip ends adjacent the outer periphery of the core.

For totally enclosed motors, the annular section of the end frame may be provided in overlapping engagement with the outer edge of the stator core to form a totally enclosed connection. In this construction, the axial lengths of the free ends of the strips determine the amount of overlap between the parts and assist in achieving the proper radial and axial relative positions of the end frame and stator core. When an open type connection between the stator core and end frame is desired, the strip ends may be utilized to mount the annular section of the end frame in axially spaced relation to the outer edge of the core to furnish the desired axial spacing at that location as well as the proper radial and axial relative positions between the stator and end frame. The inherent spring-like characteristics of the strip ends serve to position the end frame radially such that its axis for support of the rotor shaft is in the correct location with respect to the other components of the motor.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

In the drawings:
FIG. 1 is a side view, partially broken away and in section, of a small horsepower electric motor of the totally enclosed type incorporating one form of the present invention;
FIG. 2 is a view in perspective of the stator core of FIG. 1 showing the manner in which elongated relatively stiff strip members hold the laminations rigidly together, with one strip member being removed to show details;
FIG. 3 is an enlarged partial view of a part of FIG. 1 to reveal the way in which the strip members cooperate with the end frame of the illustrated motor;
FIG. 4 is a partial side view, partly broken away and in section, of a small horsepower electric motor of the open type incorporating the present invention;
FIG. 5 is an enlarged partial view of a portion of FIG. 4 with the windings removed to show details; and
FIG. 6 is a view in perspective of the stator core of FIG. 4 mounting one end of the end frames seen in FIG. 4 to show further details.

Referring now to the drawings and more specifically to FIGS. 1–3 inclusive, numeral 10 signifies a small horsepower dynamoelectric machine of the totally enclosed, double shaft extension type, such as a fractional horsepower electric motor, which incorporates one form of the present invention. The motor of the exemplification is provided with a stator having a core 11 of sheet-like laminations 12 formed of magnetic material such as steel superimposed in face-to-face relation to produce an aligned stack of pre-selected length. If desired, the sides of the laminations facing one another may be covered with suitable varnish, oxide, or the like to furnish an insulating barrier between adjacent laminations. The stator core 11 has a generally cylindrical outer periphery 13 and a concentric bore 14 which defines the air gap with a rotor 15 of standard design. As illustrated, the rotor includes a magnetic core carrying a squirrel-cage secondary winding 16 cast integrally with axially projecting impeller blades 17 on each of its end rings. A plurality of conventional winding slots 18 extend radially outward from the bore 14 in which field windings 21 are disposed having end turns 22 projecting axially beyond the respective side faces 23 of the core.

In order to secure the laminations firmly together with sufficient strength to resist torsional twist and pull, each lamination of the stack is punched out with slots at a number of angularly spaced apart predetermined locations and are aligned when the laminations are stacked together to define a number of circumferentially spaced apart shallow grooves 25 extending transversely across the outer periphery 13 of the stack. For purposes of illustration, four equally spaced apart grooves are provided in the embodiment of FIGS. 1–3. Each groove has a substantially flat base or bottom wall and side walls which converge outwardly to form, in effect, a dovetail cross-section configuration for the grooves. An elongated strip member 26 is accommodated in each of the grooves in frictional engagement with the groove walls to hold the stack together. These members may be conveniently stamped from substantially rectangular elongated strip material, such as steel, preferably having a transverse cross-section slightly larger than that of the groove width. These strip members may be easily inserted into their accommodating grooves before the winding has been assembled on the core by holding the laminations temporarily together, such as by clamps or the like with the desired compression, and then compressing each strip into an arc shape in transverse cross-section (not shown). The strip member may then be inserted into the groove and external pressure may be applied against the central portion 27 of the strip member to flatten that portion against the bottom wall of the groove and cause its edges to move laterally against the groove side walls. This results in a strong frictional engagement between the strip member and each lamination.

It will be observed from FIGS. 1, 2, and 3 that strips 26 have free ends 28 which project axially beyond the respective side faces 23 and outer peripheral edges 29 of the core, a pre-selected distance radially above the end turns 22 of the winding. In the illustrated embodiment of these figures, the free ends are similar to cantilever springs serving to position an end frame 31 at either side of the core such that the end frame forms a totally enclosed connection with the associated outer core edge 29. In addition, the free ends of the strips properly align each end frame with respect to the axis of the machine and the stator bore 14. The end frames may be of any suitable construction, and by way of example, are identical in structure, each having a die cast member formed of aluminum or other well-known material into a bell-shaped contour. Centrally of the casting is provided an integral axial bearing housing 33 facing the interior of the motor which includes an accurately finished or machined inner surface 34 for mounting a suitable bearing, such as the outer race of the illustrated ball bearing 35. The outer edge of the end frame member has an annular section, designated by numeral 36 in these figures, arranged to overlap core edge 29 in complementary engaging relation.

It is desirable, therefore, in the end frames of the exemplification under consideration to machine the inner circumference of section 36 into a finished cylindrical surface 37 co-axial with surface 34 and hence with the rotational axes of the bearings, and to form a circular shoulder 38 perpendicular to surface 37. By providing all the transverse edges 30 of the free ends 28 of the strips in a single plane perpendicular to the rotational axis of the machine, that is, having the edges squared off and having these edges in abutting engagement with shoulder 38 of the end frame, the amount of overlap between section 36 (e.g., surface 37) and core edge 29 can readily be regulated. In addition, the exact axial location of bearing 35 relative to the stator core or rotor can be readily controlled as well as a co-axial relation between these parts. To insure these relationships and augment the strength of the totally enclosed connection, it is desirable to provide the free ends 28 of the strips with transversely curved outer surfaces so that they are all, in effect, arcs of the same circle, having a common center of generation at the rotational axis of the machine.

By forming each strip with a sufficient initial thickness, the transverse curve of the strip end may be obtained even though the bottom of the strip portion 27 has been pressed tightly against a flat bottom wall of grooves 25. In this regard, it is convenient to machine both the upper surface and extreme edge 30 of each strip end 28 as well as the outer edge 29 of the core to obtain the proper dimensions which furnish the preferred fit between the engaging parts 28, 29, and 36. The respective depths of each groove 25 and of machined edge 29 have been exaggerated in FIGS. 1–3 to show this. The upper transverse edge of each strip end may be tapered (not shown) to assist in their assembly with the end frames. However, the inherent slight radial resilience characteristics of the free ends, which are slightly deflectable similar to a cantilever beam toward the axis of the machine, are usually sufficient to permit easy assembly of the mating parts in spite of the close fit. The deflectable strip ends tend to guide end frame section 36 into the proper location with respect to core edge 29. Of course, the grooves across the stack may be formed with a convex bottom wall to provide the preferred transverse curvature of the strip ends 28. This curved structure of the entire strip end cross-section has the added advantage of providing rigidity in a transverse direction without unnecessarily interfering with their slightly deflectable, cantilever beam type radial movement.

In actual practice, I have obtained satisfactory results by forming inner surface 37 of the end frame with a diameter of 3.637–3.639 inches and the mating edge of the core and a pair of diametrically opposite transversely curved strip ends outer surfaces with a diameter of 3.638–3.640 inches to produce the engaging and overlapping fit. Each strip had a nominal initial thickness of 0.278 inch and a nominal transverse dimension or width of 0.032 inch before machining. These surfaces of the core were readily machined, including a "face-off" of the edges of strip ends, by a conventional cutting tool during the same shaping operation, with the core being rotatably mounted on a standard expansible mandrel inserted in the bore 14 of the core.

It is, of course, necessary that strip ends 28 have sufficient lateral stiffness to permit this machining operation. Thus core edge 29 and strip ends 28 may be provided concentric with the axis of rotation of the rotor and while forming a totally enclosed connection with each end frame, they also mount the end frames such that the axes of the bearings are in co-axial relation with one another and with the axis of the machine. Consequently, the inner races of the bearings, secured to rotate with the double extension shaft 19 which carries rotor 15 concentric therewith, cooperate in supporting the rotor concentrically within the stator bore 14 to provide a generally uniform air gap for the machine. The present invention also provides a way for controlling the end play of the rotor and pre-load for the bearing when ball bearings are used due to the accurate manner in which the strip ends 28 locate the end frames relative to the stator core, even though the connections between the stator and the respective end frames are totally enclosed.

For maintaining end frames 31 and the stator in the assembled relation described above, annular sections 36 of the end frames are cast with radial flanges 42 which extend above the outer periphery 13 of the stator core. A number of bolts 43 (two diametrically opposed bolts in the illustrated exemplification) project axially through these flanges to hold the assembled components firmly together between bolt heads 44 and nuts 45, threadingly engaging the threaded end of the bolts.

Turning now to FIGS. 4, 5, and 6, the present invention is shown embodied in an electric motor of the open type in which identical parts with those already described in connection with the first three figures are indicated by like numerals. The rotor and stator are essentially the same as that of the embodiment seen in FIGS. 1–3 inclusive, with the stator differentiating principally therefrom in the manner in which it mounts the motor end frames, denoted by reference 31a in FIGS. 4, 5, and 6. Like that of FIGS. 1–3, angularly spaced apart, stiff elongated strip members 26a are provided in grooves 25 for securing the laminations together. The free ends 28a of the strips project axially beyond the respective side faces of the core and terminate in transverse edges 30a which are all disposed substantially in the same plane located perpendicular to the axis of the machine. These free ends are slightly deflectable in a radial direction forming, in effect, an interrupted arcuate-shaped seat to furnish the sole support of the end frames in the desired position relative to the stator and the axis of rotation of the rotor.

More specifically, strip ends 28a are arcuate-shaped in a transverse direction, with their outer curved surfaces being approximately a part of the same circle having a common center of revolution at the rotational axis of the motor. By properly dimensioning strip ends 28a in an axial direction, when annular section 36 of the respective end frames are assembled to ends 28a in the manner seen in FIGS. 4, 5, and 6, that is, with strip edges 30a resting against shoulder 38, the rim of the end frame will be supported in axially spaced relation to the outer edge of the stator core. This, in turn, creates enlarged openings 51 defined betwen the free ends of the strips, the outer edge 29 of the core, and annular section 36 of the end frames for motor ventilation purposes. In addition, due to the engagement between strip edges 30a and shoulder 38 and the slight resilience of the free ends of the strips as previously indicated, they will tend to deflect radially similar to a cantilever beam and mount the associated end frame 31a such that the bearing axis of bearing 35 (FIG. 4) is coincident with the common center of the strip ends and the axis of the machine.

To insure this end, the radius of the outer surface of the individual strip ends from the axis should be approximately the same as or slightly greater than that defining inner surface 37 of annular section 36 which is supported by the free ends. Moreover, the total circumferential length of the outer surfaces of the strip ends at one side of the stator should be at least 30% of the total circumference, with each surface having a transverse curvature in the order of 15°–20° for best results. Consequently in the embodiment of FIGS. 4–6, there are eight equally spaced apart strips 26a, each having a free end 28a with a transversely curved outer surface in that range. The cross-section or thickness of each strip, if adequate to provide the desired slight radial deflecting action, should be sufficient to permit a machining operation of the free ends after assembly of the core, if such is desired.

It will be recognized from the above description that the embodiment of FIGS. 4–6 inclusive includes the same beneficial features of proper alignment of the rotor, stator, and bearings achieved by the embodiment shown in FIGS. 1–3 and permits an accurate control of rotor and play and bearing pre-load. Further, a highly desirable ventilation flow pattern may be attained at relatively low cost.

In this latter regard, the end frames include ventilation openings 52 directly over the bearing housing 33 for the admittance of air or other coolant to the interior of the motor. The rotor impeller blades 17 drive the coolant around the exposed winding end turns and into contact with the end face 23 of the stator core, the flow being indicated by arrows in FIG. 4. The heat generated by these parts during motor operation is transferred to the air which is then exhausted to the ambient beyond the confines of the motor through the enlarged and unobstructed openings 51 furnished at the outer edge of the core, directly over the end turns.

While in accordance with the patent statutes, I have described what at present are considered to be the preferred embodiments of my invention, it still will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a dynamoelectric machine, a stator comprising a core including a plurality of laminations arranged in juxtaposed relation to form a stack having side faces and a rotor receiving bore, at least one winding accommodated by said core with end turns projecting beyond each side face of said core, a plurality of grooves extending transversely across the outer periphery of said stack at angularly spaced apart locations, stiff elongated strip members accommodated in at least some of said grooves connecting the laminations of the stack together, said strip members having free ends extending axially beyond at least one outer edge of the core radially above said end turns for a predetermined axial distance, said free ends being radially resilient and including transversely curved outer surfaces with the curvatures thereof defining arcs of substantially the same circle having a center of revolution at the rotational axis of the machine, and an end frame having an annular section disposed adjacent the outer edge of said core in overlapping and complementary relation to form a totally enclosed connection therewith, said resilient strip ends firmly engaging said annular section of the associated end frame thereby providing a preselected position for said end frame relative to said stator core.

2. In a dynamoelectric machine, a stator comprising a core including a plurality of laminations arranged in juxtaposed relation to form a stack having side faces and a rotor receiving bore, at least one winding accommodated by said core with end turns projecting beyond each side face of said core, a plurality of grooves extending transversely across the outer periphery of said stack at angularly spaced apart locations, stiff elongated strip members accommodated in at least some of said grooves connecting the laminations of the stack together, said strip members having free ends thereof extending axially beyond at least one outer edge of the core radially above said end turns for a predetermined axial distance, said free ends including transversely curved outer surfaces with the curvatures thereof defining arcs of substantially the same circle having a center of revolution at the rotational axis of the machine, and an end frame having an annular section mounted to the free ends of said strips in a predetermined axially spaced relation to the outer edge of the core, said free ends being resilient in a radial direction for radially centering said associated end frame with respect to the rotational axis of the machine.

3. In a dynamoelectric machine, a stator comprising a core including a plurality of laminations arranged in juxtaposed relation to form a stack having side faces and a rotor receiving bore, at least one winding accommodated by said core with end turns projecting beyond each side face of said core, a plurality of grooves extending transversely across the outer periphery of said stack at angularly spaced apart locations, stiff elongated strip members accommodated in at least some of said grooves connecting the laminations of the stack together by frictional engagement with the walls of the accommodating grooves, said strip members each having at least one free end thereof extending axially beyond the associated outer edge of the core radially above said end turns for a predetermined axial distance, an end frame connected adjacent said associated core outer edge and including a section firmly engaging said free ends of said strip members thereby being mounted in a pre-selected position relative to said stator, said free ends of said strip members being radially resilient and deflectable in a radial direction to facilitate engagement of the end frame section therewith.

4. In a dynamoelectric machine, a stator comprising a core including a plurality of laminations arranged in juxtaposed relation to form a stack having side faces and a rotor receiving bore, at least one winding accommodated by said core with end turns projecting beyond each side face of said core, a plurality of grooves extending transversely across the outer periphery of said stack at angularly spaced apart locations, stiff elongated strip members accommodated in at least some of said grooves connecting the laminations of the stack together by frictional engagement with the walls of the accommodating grooves, said strip members having free ends extending axially beyond at least one outer edge of the core for a predetermined axial distance, said free ends being resilient in a radial direction and including transversely curved outer surfaces with the curvatures thereof defining arcs of substantially the same circle having a center of revolution at the rotational axis of the machine, and an end frame having a generally annular section having an internal diameter slightly less than the diameter of said same circle whereby said section is firmly engaged by said free ends thereby mounting said end frame in a pre-selected position relative to said stator.

5. The dynamoelectric machine of claim 3 in which the section of said end frame overlaps said associated core outer edge in complementing relation to form a totally enclosed conection therewith.

6. The dynamoelectric machine of claim 3 in which the free ends of said strip include transversely curved arcuate outer surfaces lying in the same circular plane, the arcuate surfaces having a total circumferential length of at least thirty percent of the total circumference of the circle thereby to provide the optimum support for said end frame.

References Cited by the Examiner
UNITED STATES PATENTS

| | | | |
|---|---|---|---|
| 1,626,028 | 4/1927 | Daun | 310—217 |
| 1,771,475 | 7/1930 | Wright | 310—258 |
| 1,851,572 | 3/1932 | Ehrenfeld | 310—258 |
| 2,001,799 | 5/1935 | Seyfried | 310—258 |
| 2,582,005 | 1/1952 | Carlson | 310—258 |
| 2,610,225 | 8/1952 | Korski | 310—217 |
| 2,763,796 | 9/1956 | Happe | 310—258 |
| 3,253,171 | 6/1966 | Storck | 310—217 |

FOREIGN PATENTS

| | | |
|---|---|---|
| 1,020,720 | 12/1957 | Germany. |
| 842,316 | 7/1960 | Great Britain. |

MILTON O. HIRSHFIELD, *Primary Examiner.*

J. W. GIBBS, *Assistant Examiner.*